United States Patent
Ichimura

(10) Patent No.: US 10,845,579 B2
(45) Date of Patent: Nov. 24, 2020

(54) OPTICAL SYSTEM AND IMAGING APPARATUS

(71) Applicant: CANON KABUSHIKI KAISHA, Tokyo (JP)

(72) Inventor: Junya Ichimura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 130 days.

(21) Appl. No.: 16/186,359

(22) Filed: Nov. 9, 2018

(65) Prior Publication Data
US 2019/0146195 A1    May 16, 2019

(30) Foreign Application Priority Data
Nov. 14, 2017  (JP) ................... 2017-219347

(51) Int. Cl.
*G02B 9/64* (2006.01)
*G02B 13/02* (2006.01)
*G02B 13/18* (2006.01)

(52) U.S. Cl.
CPC ............... *G02B 13/18* (2013.01); *G02B 9/64* (2013.01); *G02B 13/02* (2013.01)

(58) Field of Classification Search
CPC ........ G02B 13/02; G02B 13/04; G02B 13/18; G02B 13/002; G02B 13/0045; G02B 9/64; G02B 9/12; G02B 9/34
USPC ........ 359/745–753, 754, 755, 784, 791, 716
See application file for complete search history.

(56) References Cited

U.S. PATENT DOCUMENTS

| 5,412,507 A * | 5/1995 | Sato ............... G02B 15/173 359/687 |
| 2005/0046964 A1 | 3/2005 | Kashiki |
| 2006/0056051 A1 | 3/2006 | Hakko |
| 2014/0347749 A1* | 11/2014 | Ono ............... G02B 13/00 359/754 |
| 2019/0094496 A1 | 3/2019 | Miyagishima |

FOREIGN PATENT DOCUMENTS

EP       3015897 A1    5/2016

* cited by examiner

*Primary Examiner* — Marin Pichler
(74) *Attorney, Agent, or Firm* — Canon U.S.A., Inc. IP Division

(57) ABSTRACT

An optical system according to the present invention is an optical system comprises a first lens unit having positive refractive power, a second lens unit having positive refractive power, and a third lens unit having negative refractive power, arranged in order from an object side to an image side. During focusing from infinity to a closest distance, the second lens unit moves to the object side, whereby a distance between adjoining lens units is changed. The second lens unit comprises an aperture stop. The following conditional expression is satisfied:

$$1.0 < D3/BF < 3.0,$$

where D3 is a length of the third lens unit on an optical axis, and BF is a back focus distance.

17 Claims, 7 Drawing Sheets

OPTICAL SYSTEM AND IMAGING APPARATUS

BACKGROUND OF THE INVENTION

Field of the Invention

The present invention relates to an optical system and an imaging apparatus.

Description of the Related Art

There is a demand on a large-aperture lens, having an F-number of 2.0 or less and intended for medium telephoto imaging, for high speed focusing and small aberration variations during focusing.

European Patent No. 3015897 A discusses an optical system consisting of a first lens unit having positive refractive power, a second lens unit having negative refractive power, and a third lens unit having positive refractive power, arranged in order from an object side to an image side. The optical system is an inner focus type optical system in which the second lens unit having relatively light-weight moves during focusing.

The optical system discussed in European Patent No. 3015897 A includes an aperture stop that is arranged closest to the image side of the first lens unit, and has an F-number of 2.9 or more. If the lens system having the same configuration as discussed in European Patent No. 3015897 A but having a smaller F-number and a shorter back focal length is implemented, aberrations such as spherical aberration, distortion aberration and field curvature, and aberration variations during focusing are likely to increase.

SUMMARY OF THE INVENTION

According to an aspect of the present invention, an optical system includes a plurality of lens units in which a distance between adjoining lens units changes during focusing, the plurality of lens units comprising a first lens unit having positive refractive power, a second lens unit having positive refractive power, and a third lens unit having negative refractive power, and the first to third lens units being arranged in order from an object side to an image side, wherein: the second lens unit moves to the object side during focusing from infinity to a closest distance, the second lens unit comprises an aperture stop, and the following conditional expression is satisfied:

$$1.0 < D3/BF < 3.0,$$

where D3 is a length of the third lens unit on the optical axis of the optical system, and BF is a back focal length.

Further features of the present invention will become apparent from the following description of exemplary embodiments with reference to the attached drawings.

DESCRIPTION OF THE EMBODIMENTS

Optical systems and imaging apparatuses according to exemplary embodiments of the present invention will be described in detail below with reference to the accompanying drawings. Each of the embodiments of the present invention described below can be implemented solely or as a combination of a plurality of the embodiments or features thereof where necessary or where the combination of elements or features from individual embodiments in a single embodiment is beneficial.

Exemplary Embodiments of Optical Systems

Figure 1:
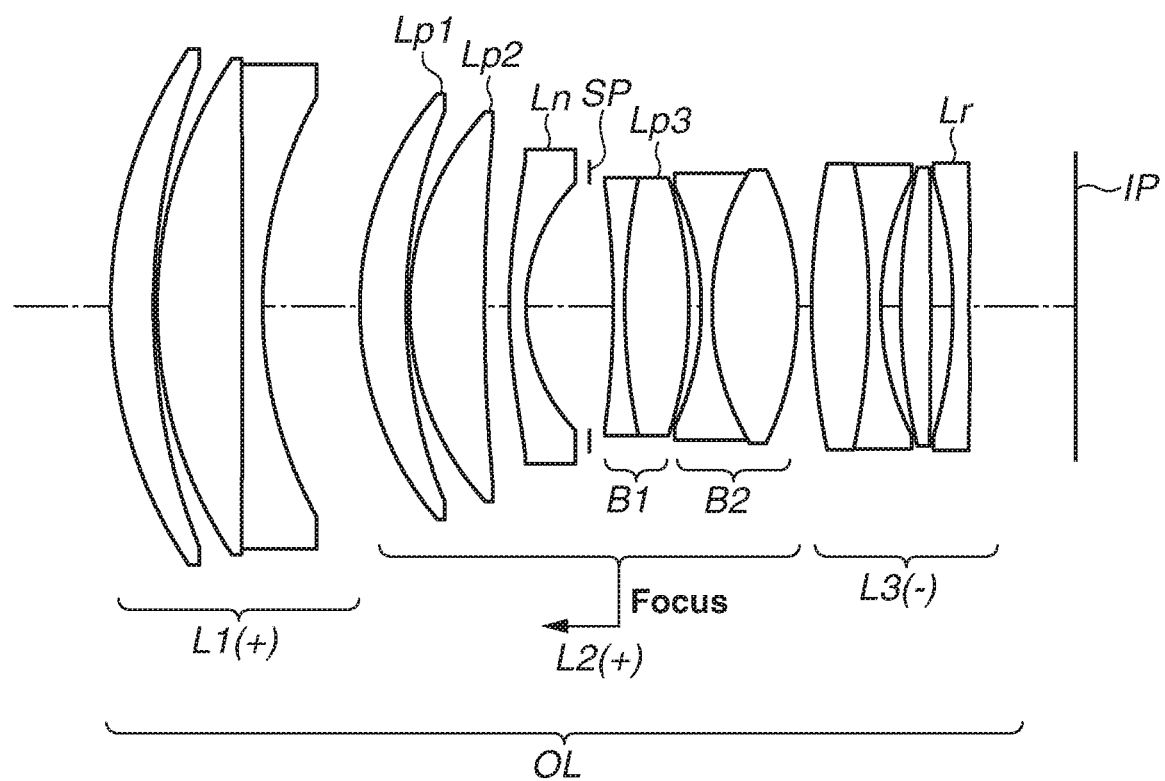
FIG. 1 is a sectional view illustrating a zoom lens according to a first exemplary embodiment.
Figure 3:
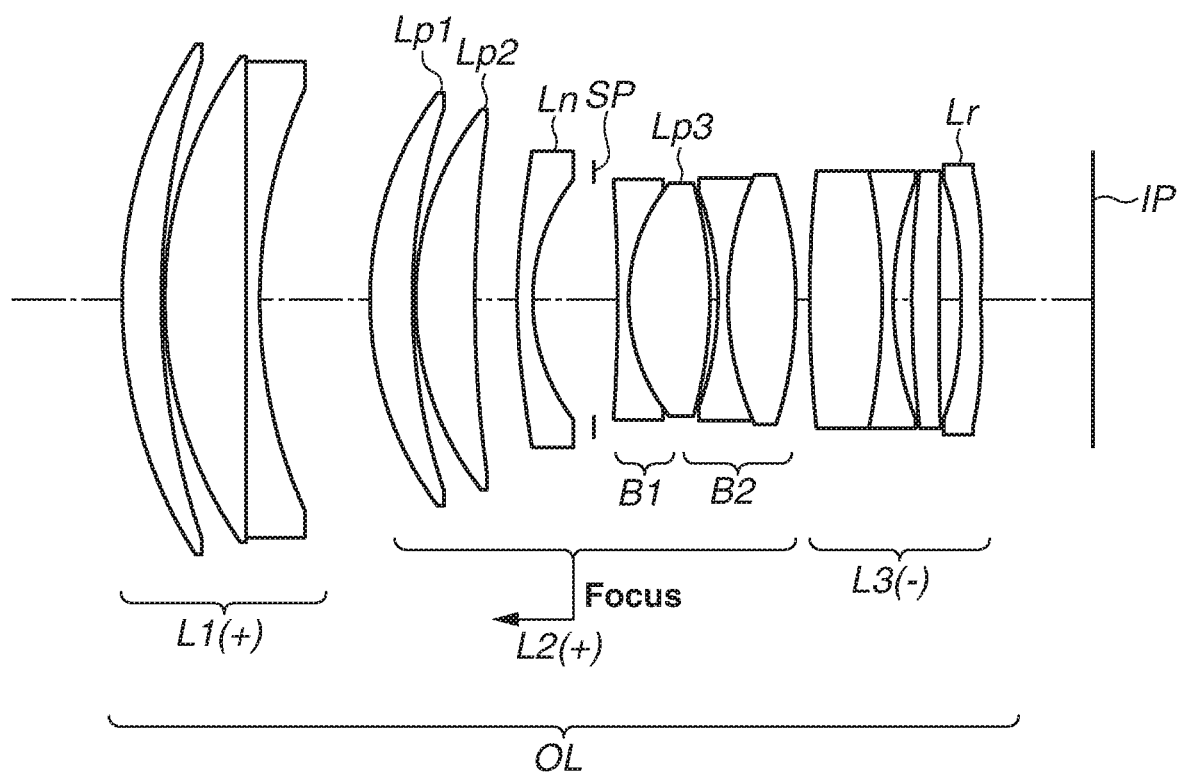
FIG. 3 is a sectional view illustrating a zoom lens according to a second exemplary embodiment.
Figure 5:
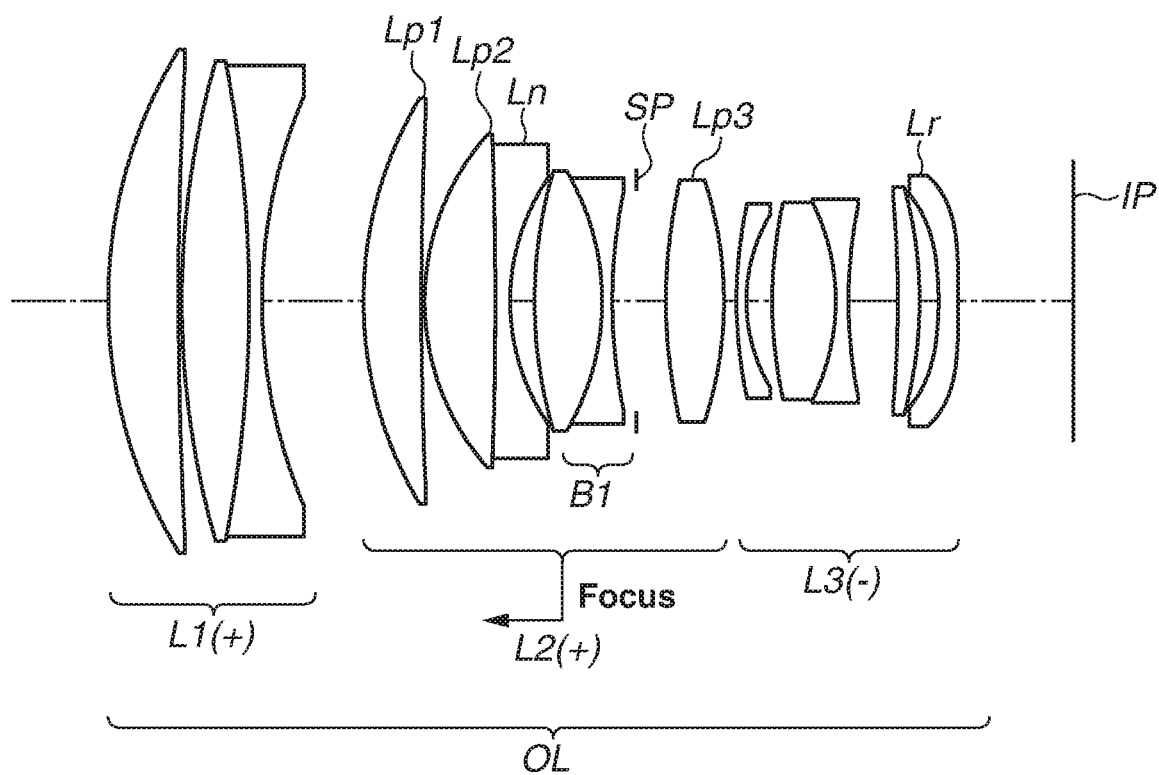
FIG. 5 is a sectional view illustrating a zoom lens according to a third exemplary embodiment.

The optical systems according to the exemplary embodiments are imaging optical systems that are implemented in an imaging apparatus, such as a video camera, a digital camera, a silver-halide film camera, and a television camera. FIGS. 1, 3, and 5 are sectional views each illustrating an optical system, in which an object side (front) is illustrated to the left and an image side (rear) to the right. In each of the sectional views, an ith lens unit is denoted by Li, where i indicates the order of lens units from the object side to the image side. An aperture stop SP determines (limits) the luminous flux at a maximum aperture (F-No).

If the optical systems according to the exemplary embodiments are implemented in an imaging apparatus, such as a video camera and a digital camera, an image plane IP corresponds to a solid-state image sensor (photoelectric conversion element), such as a charge-coupled device (CCD) sensor and a complementary metal-oxide-semiconductor (CMOS) sensor. If the optical systems according to the exemplary embodiment are implemented in an imaging apparatus that is a silver-halide film camera, the image plane IP corresponds to a film surface.

During focusing from infinity to the closest distance, a second lens unit L2 which is a focus lens unit moves to the object side as illustrated by an arrow in each of the diagrams.

In each spherical aberration diagram, a solid line represents spherical aberration at the d-line (587.60 nm in wavelength), a dotted line represents spherical aberration at the F-line (wavelength of 486.10 nm), a broken line represents spherical aberration at the C-line (wavelength of 656.30 nm), and a double-dotted dashed line represents spherical aberration at the g-line (wavelength of 435.80 nm). In an astigmatism diagram, a solid line S represents astigmatism at the sagittal image plane, and a broken line M represents astigmatism at the meridional image plane. In each distortion aberration diagram, distortion aberration at the d-line is indicated. In each chromatic aberration diagram, chromatic aberration at the g-line is indicated.

An optical system according to an exemplary embodiment of the present invention includes a first lens unit L1 having positive refractive power, a second lens unit L2 having positive refractive power, and a third lens unit L3 having negative refractive power, which are arranged in order from the object side to the image side. The optical system according to each exemplary embodiment to be described below comprises a first lens unit L1 having positive refractive power, a second lens unit L2 having positive refractive power, and a third lens unit L3 having negative refractive power, which are arranged in order from the object side to the image side. During focusing from infinity to the closest distance, the second lens unit L2 moves to change distances between the adjoining lens units.

The second lens unit L2 includes the aperture stop SP. Aberration variations due to focusing can be reduced by moving the aperture stop SP as well during focusing.

The optical system according to each exemplary embodiment satisfies the following conditional expression:

$$1.0 < D3/BF < 3.0. \quad (1)$$

D3 is the length of the third lens unit L3 on an optical axis. BF is the back focal length of the optical system. The back focal length refers to the distance from the lens surface located closest to the image side of the optical system to the image plane IP, expressed in terms of air-equivalent length.

The conditional expression (1) relates to the ratio between the length of the third lens unit L3 and the back focal length. If the length of the third lens unit L3 decreases below the lower limit value of the conditional expression (1), i.e., the number of the lenses of the third lens unit L3 is relatively small, the Petzval sum in the combination of the plurality of lenses is difficult to be reduced. This causes difficulty in correcting the aberration of, for example, field curvature.

If the length of the third lens unit L3 increases beyond the upper limit value of the conditional expression (1), the movable range of the second lens unit L2 during focusing becomes narrow. This causes difficulty in focusing at short distances in particular.

The numerical range of the conditional expression (1) can be set as follows:

$$1.2 < D3/BF < 2.6. \quad (1a)$$

The numerical range of the conditional expression (1) can be further set as follows:

$$1.4 < D3/BF < 2.2. \quad (1b)$$

The above-described configuration of the optical system can provide a large-aperture optical system in which aberration variations are reduced during focusing.

The optical system can further satisfy at least one of the following conditional expressions (2) to (7):

$$2.0 < f1/f < 10.0, \quad (2)$$

$$0.3 < f2/f < 1.2, \quad (3)$$

$$-10.0 < f3/f < -0.1, \quad (4)$$

$$20 < \nu d2 - \nu d1 < 80, \quad (5)$$

$$0.59 < \theta gF < 0.67, \text{ and} \quad (6)$$

$$1.70 < Nd1 < 1.90. \quad (7)$$

In the conditional expressions (2) to (7), f1 is the focal length of the first lens unit L1, f2 is the focal length of the second lens unit L2, f3 is the focal length of the third lens unit L3, and f is the focal length of the entire optical system. Among two positive lenses of the second lens unit L2 arranged on the object side of the aperture stop SP, vd1 is the Abbe number of the material of the positive lens on the object side (hereinafter, referred to as a first positive lens), vd2 is the Abbe number of the material of the positive lens on the image side (hereinafter, referred to as a second positive lens). The partial dispersion ratio of the material of the first positive lens is θgF, and the refractive power of the material of the first positive lens at the d-line is Nd1.

The Abbe number vd and the partial dispersion ratio θgF of a material are expressed by the following equations:

$$\nu d = (Nd-1)/(NF-NC), \text{ and}$$

$$\theta gF = (Ng-NF)/(NF-NC),$$

where Ng is the refractive index for the g-line (435.80 nm in wavelength), Nd is the refractive index for the d-line (587.60 nm in wavelength), NF is the refractive index for the F-line (486.10 nm in wavelength), and NC is the refractive index for the C-line (656.30 nm in wavelength).

The technical significance of the conditional expressions (2) to (7) will be described below.

The conditional expression (2) relates to the ratio between the focal length f1 of the first lens unit L1 and the focal length f of the entire optical system. If the focal length f1 of the first lens unit L1 decreases below the lower limit value of the conditional expression (2), i.e., the refractive power of the first lens unit L1 increases, the refractive power of the second lens unit L2 decreases accordingly. This lowers the focus sensitivity and increases the amount of movement of the second lens unit L2 during focusing, which consequently increases the size of the optical system undesirably. If the focal length f1 of the first lens unit L1 increases beyond the upper limit value of the conditional expression (2), the rays of light travelling through the first lens unit L1 are likely to diverge. This causes the radial size of the second lens unit L2 to increase undesirably.

The conditional expression (3) relates to the ratio between the focal length f2 of the second lens unit L2 and the focal length f of the entire optical system. If the focal length f2 of the second lens unit L2 decreases below the lower limit value of the conditional expression (3), the incident angle of the rays to the second lens unit L2 when a needed amount of peripheral light is secured increases, and thus the diameter of the first lens unit L1 arranged on the object side of the second lens unit L2 increases. This increases the size and weight of the optical system undesirably. If the focal length f2 of the second lens unit L2 increases beyond the upper limit value of the conditional expression (3), i.e., the refractive power of the second lens unit L2 decreases, the focus sensitivity decreases, which consequently increases the amount of movement of the second lens unit L2 during focusing. This causes the size of the optical system to increase undesirably.

The conditional expression (4) relates to the ratio between the focal length f3 of the third lens unit L3 and the focal length f of the entire optical system. If the focal length f3 of the third lens unit L3 increases below the lower limit value of the conditional expression (4), i.e., the refractive power of the third lens unit L3 decreases, the focus sensitivity of the optical system decreases, which consequently, increases the amount of movement of the second lens unit L2 during focusing. This causes the size of the optical system to increase undesirably. If the focal length f3 of the third lens unit L3 decreases beyond the upper limit value of the conditional expression (4), i.e., the refractive power of the third lens unit L3 increases, the lenses constituting the third lens unit L3 increase in diameter. This causes the weight of the third lens unit L3 to increase undesirably.

The conditional expression (5) relates to the Abbe numbers of the materials of the positive lenses included in the second lens unit L2. The conditional expression (5) shows that the second positive lens has an Abbe number higher than that of the first positive lens. If the Abbe numbers vd1 and vd2 fall below the lower limit value of the conditional expression (5), correction of the axial chromatic aberration becomes undesirably difficult. If the difference between the Abbe numbers νd1 and νd2 exceeds the upper limit value of the conditional expression (5), the selection of the materials becomes difficult.

The first positive lens made of the material having the Abbe number νd1 can be arranged closest to the object side of the second lens unit L2. Using the lens of high dispersion material at this position can reduce secondary axial chromatic aberration of the second lens unit L2.

The conditional expression (6) relates to the partial dispersion ratio θgF of the first positive lens. If the partial dispersion ratio θgF falls below the lower limit value of the conditional expression (6), the axial chromatic aberration increases undesirably. If the partial dispersion ratio θgF exceeds the upper limit value of the conditional expression (6), the selection of the material becomes difficult.

The conditional expression (7) relates to the refractive index Nd1 of the first positive lens. If the refractive index Nd1 falls below the lower limit value of the condition expression (7), i.e., the curvature of the lens surface becomes large, the spherical aberration increases undesirably due to an increase in the incident angle of the rays on the first positive lens. If the refractive index Nd1 exceeds the upper limit value of the condition expression (7), the light transmittance decreases undesirably.

The numerical ranges of the conditional expressions (2) to (7) can be set as follows:

$$2.0 < f1/f < 8.0, \quad (2a)$$

$$0.4 < f2/f < 1.1, \quad (3a)$$

$$-8.0 < f3/f < -0.2, \quad (4a)$$

$$30 < \nu d2 - \nu d1 < 70, \quad (5a)$$

$$0.60 < \theta gF < 0.66, \text{ and} \quad (6a)$$

$$1.73 < Nd1 < 1.87. \quad (7a)$$

The numerical ranges of the conditional expressions (2) to (7) can further be set as follows:

$$2.0 < f1/f < 7.0, \quad (2b)$$

$$0.5 < f2/f < 1.0, \quad (3b)$$

$$-6.0 < f3/f < -0.2, \quad (4b)$$

$$40 < \nu d2 - \nu d1 < 60, \quad (5b)$$

$$0.61 < \theta gF < 0.65, \text{ and} \quad (6b)$$

$$1.75 < Nd1 < 1.85. \quad (7b)$$

In the second lens unit L2, the aperture stop SP can be arranged between a positive lens arranged on the object side of the aperture stop SP and a positive lens arranged on the image side of the aperture stop SP. If the aperture stop SP is arranged closest to the object side of the second lens unit L2, correction of the axial chromatic aberration undesirably becomes difficult since the aperture diameter increases and the diameters of the lenses arranged on the image side of the aperture stop SP increase. If the aperture stop SP is arranged closest to the image side of the second lens unit L2, peripheral rays of the axial beam of light traveling toward the aperture stop SP is more likely to be blocked.

Aberration variations due to focusing can be easily reduced in such a manner that the second lens unit L2 is configured to have a substantially symmetrical balance in refractive power between in front of and behind the aperture stop SP.

The second lens unit L2 can further include a negative lens between a positive lens arranged on the object side of the aperture stop SP and the aperture stop SP. With such a negative lens, the light beam converted by the first lens unit L1 can be shaped so that the light beam is substantially perpendicularly incident on the aperture stop SP, whereby the blocking of the peripheral rays of the axial light beam by the aperture stop SP can be suppressed. The negative lens may be a meniscus lens with aspherical shape, which can contribute to the correction of spherical aberration and the downsizing of the optical system.

The second lens unit L2 can include a cemented lens including a positive lens and a negative lens, arranged to adjoin the aperture stop SP. The cemented lens is arranged at a position where the light beam is narrowed to reduce axial chromatic aberration. According to the present exemplary embodiments, a cemented lens refers not only to a plurality of lenses cemented using a polymeric adhesive. A cemented lens may refer to a plurality of lenses of which adjoining surfaces are shaped to engage with each other and which are arranged close to each other with a negligible air gap between the adjoining lenses.

The components of the cemented lens can be a negative lens made of a low refractive index, high dispersion material, and a positive lens made of a high refractive index, low dispersion material. This can reduce the Petzval sum and reduce field curvature.

The third lens unit L3 can consist of a plurality of positive lenses and a plurality of negative lenses to facilitate correction of the Petzval sum. In one example of a case where the third lens unit L3 consists of two positive lenses and two negative lenses, the Petzval sum can be corrected and sagittal flare can be reduced.

Next, configurations of the optical systems according to the exemplary embodiments will be concretely described.

First Exemplary Embodiment

Figure 2:
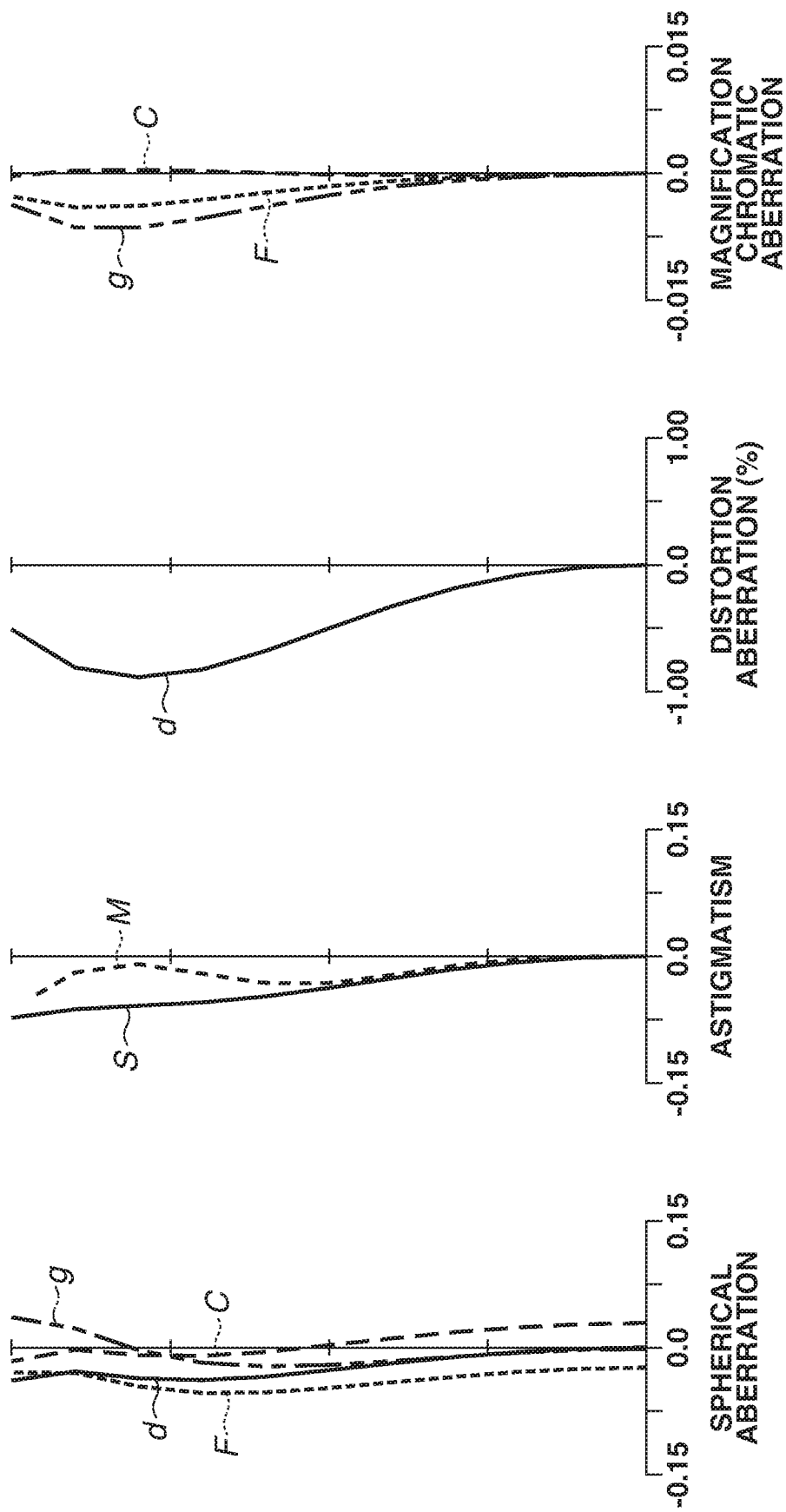
FIG. 2 is a diagram illustrating aberration diagrams of the zoom lens according to the first exemplary embodiment.

A first exemplary embodiment relates to an optical system OL having a focus length of 83.5 mm and an F-number of 1.24. FIG. 1 is a sectional diagram illustrating the optical system OL according to the first exemplary embodiment when an object at infinity is in focus. FIG. 2 illustrates aberration diagrams of the optical system OL according to the first exemplary embodiment when an object at infinity is in focus.

The optical system OL according to the first exemplary embodiment consists of a first lens unit L1 having positive refractive power, a second lens unit L2 having positive refractive power, and a third lens unit L3 having negative refractive power. With the third lens unit L3 having the negative refractive power, the entire optical system OL has a telephoto configuration. This facilitates the favorable optical performance even if the focal length of the entire optical system OL increases.

The first lens unit L1 is configured as an afocal system having low refractive power. The first lens unit L1 includes a positive lens, a positive lens, and a negative lens which are arranged in order from the object side to the image side. The first lens unit L1 thus has a telephoto configuration. In addition to the foregoing effects, the first lens unit L1 can be configured with small lens diameters even with the configuration having a small F-number and a relatively large focal length.

During focusing from infinity to the closest distance, the second lens unit L2 moves to the object side to change the distances between the adjoining lens units. The first and third lens units L1 and L3 remain stationary during the focusing. Since the first lens unit L1 tends to have a large front lens diameter, the first lens unit L1 is desirably fixed as in the present exemplary embodiment if the optical system OL is a medium telephoto optical system having an F-number of 2.0 or less. Using the first lens unit L1 as a focus lens unit would undesirably increase focusing time.

The second lens unit L2 consists of a positive lens Lp1, a positive lens Lp2, a negative lens Ln, the aperture stop SP, a cemented lens B1, and a cemented lens B2 which are arranged in order from the object side to the image side. The cemented lens B1 consists of a negative lens and a positive lens Lp3. The cemented lens B2 consists of a negative lens and a positive lens. By configuring part of the second lens unit L2 as an Ernostar type, favorable imaging performance can be obtained even with a medium telephoto optical system having a small F-number.

The material of the positive lens Lp1 (first positive lens) arranged closest to the object side of the second lens unit L2 is high refractive index material satisfying the foregoing conditional expression (7), so that spherical aberration is less likely to occur. In addition, the material of the positive lens Lp1 is high dispersion material satisfying the conditional expression (5), to reduce secondary axial chromatic aberration. Primary axial chromatic aberration is further corrected by arranging the cemented lenses B1 and B2 on the image side of the aperture stop SP.

An optical system having a small F-number tends to include thick lenses to obtain sufficient refractive power. If the lenses are made thinner to constitute an optical system with a small overall lens length, spherical aberration is likely to increase. In the present exemplary embodiment, the negative lens Ln having a lens surface of aspherical shape is arranged on the object side in the second lens unit L2. This can suppress an increase in spherical aberration while configuring an optical system having a small overall lens length. The total lens length can be obtained by adding the distance from the lens surface closest to the object side to the lens surface closest to the image side of the optical system on the optical axis and the distance of the back focal length together.

The two cemented lenses B1 and B2 are arranged on the image side of the aperture stop SP, next to the aperture stop SP. Each of the cemented lenses B1 and B2 consists of a negative lens and a positive lens.

Consequently, with the configuration in which the second lens unit L2 including the aperture stop SP moves during focusing, aberration variations due to focusing can be reduced and high optical performance can be achieved across the entire focusing area.

The third lens unit L3 is configured as a lens unit having negative refractive power. This can increase the maximum incident angle of rays on the image plane IP, compared to the case in which the third lens unit L3 is configured as a lens unit having positive refractive power. In other words, in terms of forming an image of the same size, with the configuration in which the third lens unit L3 is a lens unit having negative refractive power, the lens diameters can be made smaller.

With the configuration in which the third lens unit L3 is a lens unit having negative refractive power, the refractive power of the second lens unit L2 can be increased. This can reduce the amount of movement of the second lens unit L2 during focusing.

The third lens unit L3 consists of a cemented lens consisting of a positive lens and a negative lens, a positive lens, and a negative lens Lr which are arranged in order from the object side to the image side. In such a manner, an optical system with a reduced back focal length can be formed at least in such a manner that a telephoto optical system consisting of a positive lens and a negative lens which are arranged in order from the object side to the image side. Since the back focal length is reduced, the number of lenses arranged in the third lens unit L3 can be increased accordingly, whereby the Petzval sum can be reduced. Field curvature can thus be reduced without increasing the lenses of the first lens unit L1 which tend to have a large diameter.

The negative lens Lr arranged closest to the image side of the third lens unit L3 includes lens surfaces of aspherical shape on the object side and the image side. In a medium telephoto lens having a small F-number, a lot of center beam travels through a position closest to the image side. At that position, the negative lens Lr is arranged to reduce Field curvature and distortion aberration. To reduce field curvature, the Petzval sum is reduced in such a manner that the lens surfaces of the negative lens Lr on the object side and image side have a concave shape in the paraxial region.

Figure 4:
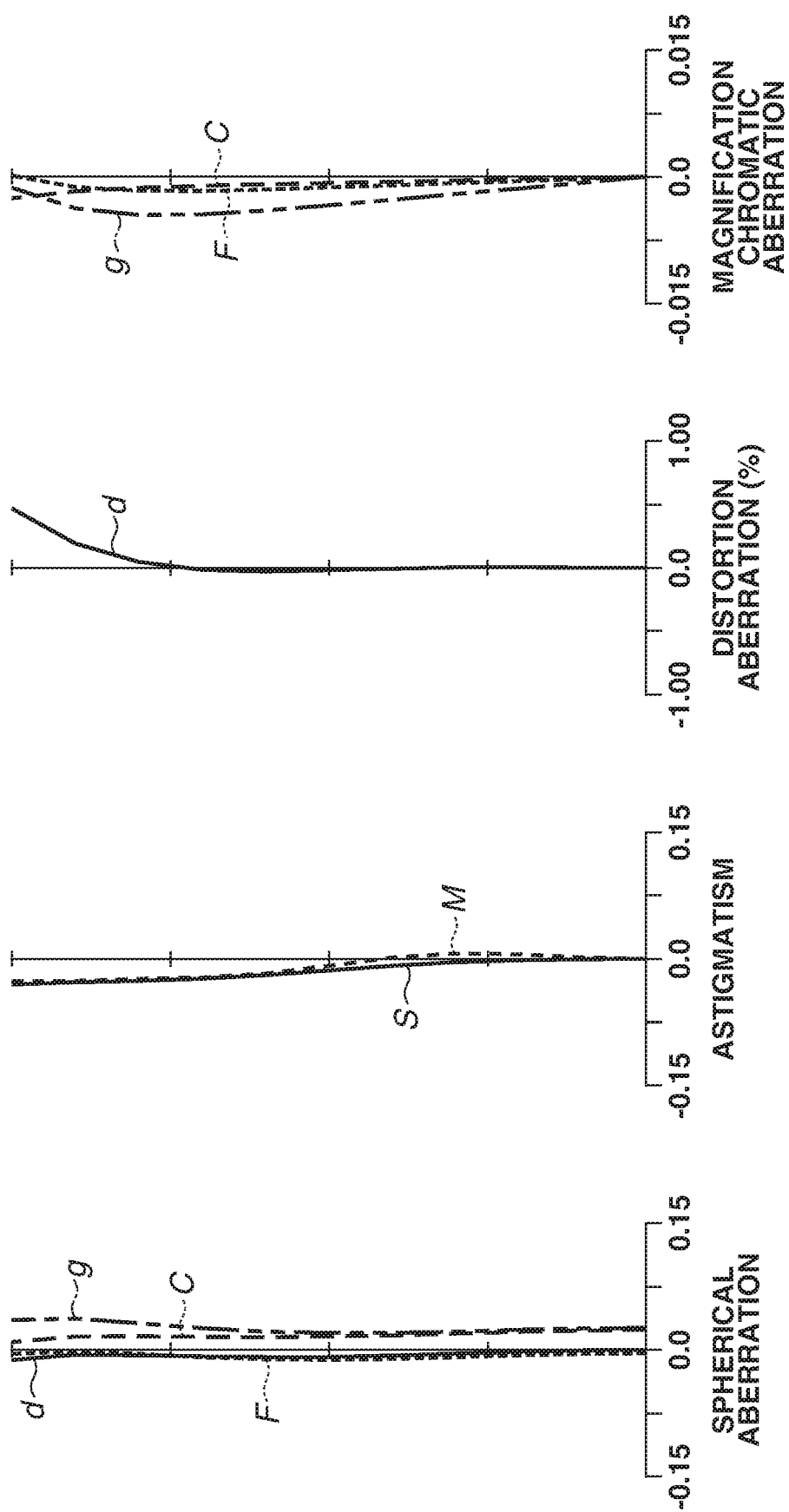
FIG. 4 is a diagram illustrating aberration diagrams of the zoom lens according to the second exemplary embodiment.

A second exemplary embodiment relates to an optical system OL having a focal length of 98.0 mm and an F-number of 1.43. FIG. 3 is a sectional diagram illustrating the optical system OL according to the second exemplary embodiment when an object at infinity is in focus. FIG. 4 illustrates aberration diagrams of the optical system OL according to the second exemplary embodiment when an object at infinity is in focus.

The optical system OL according to the second exemplary embodiment has a configuration similar to that of the optical system OL according to the first exemplary embodiment except that different glass materials are used. A detailed description will thus be omitted.

Figure 6:
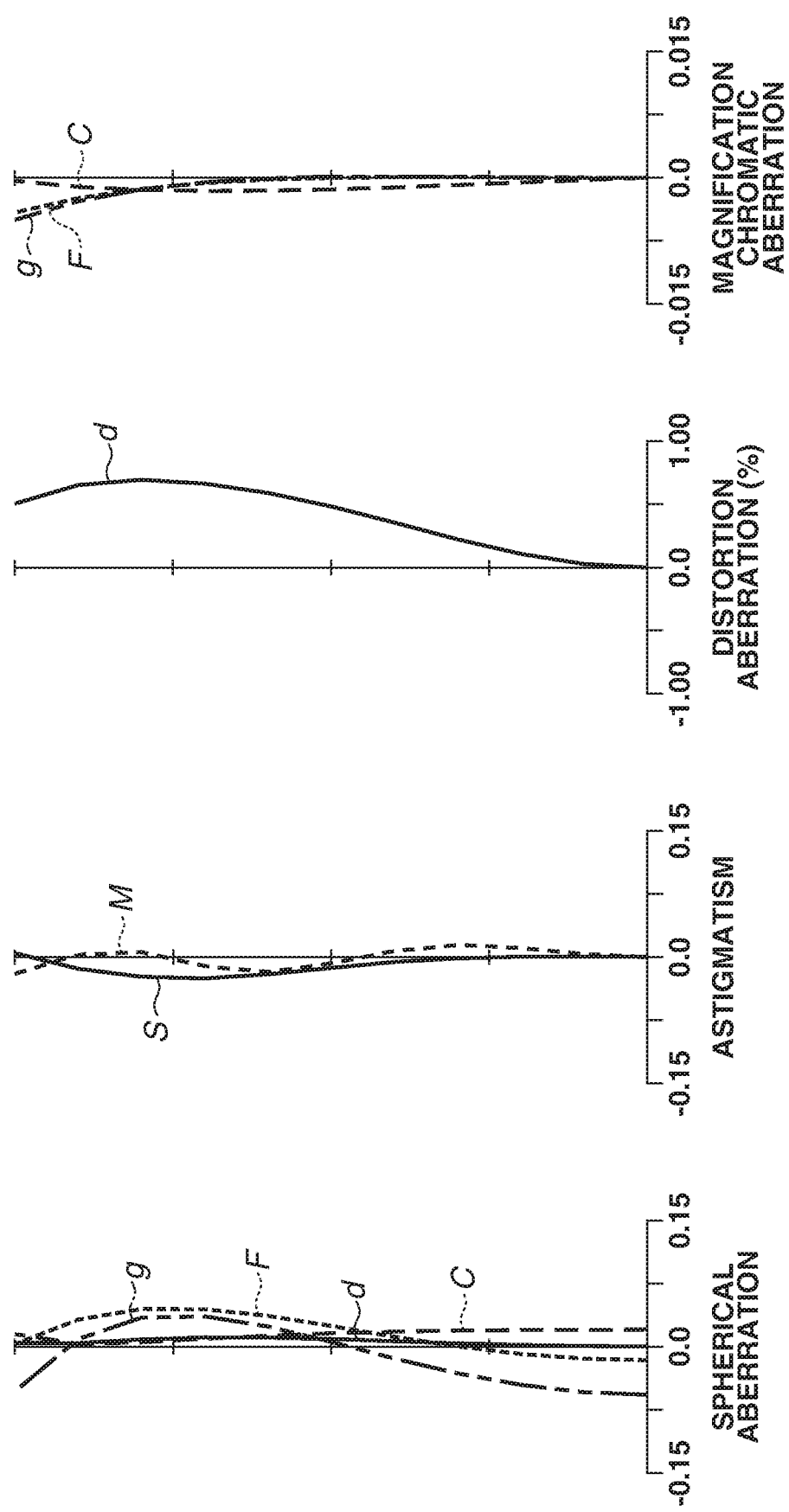
FIG. 6 is a diagram illustrating aberration diagrams of the zoom lens according to the third exemplary embodiment.

A third exemplary embodiment relates to an optical system OL having a focal length of 133.0 mm and an F-number of 1.80. FIG. 5 is a sectional diagram illustrating the optical system OL according to the third exemplary embodiment when an object at infinity is in focus. FIG. 6 illustrates aberration diagrams of the optical system OL according to the third exemplary embodiment when an object at infinity is in focus.

The optical system OL according to the third exemplary embodiment consists of a first lens unit L1 having positive refractive power, a second lens unit L2 having positive refractive power, and a third lens unit L3 having negative refractive power. During focusing from infinity to the closest distance, the second lens unit L2 moves to the object side to change the distances between the adjoining lens units. The first and third lens units L1 and L3 remain stationary during the focusing. The second lens unit L2 includes an aperture stop SP.

The first lens unit L1 according to the third exemplary embodiment has a configuration similar to that of the first lens unit L1 according to the first exemplary embodiment except that different glass materials are used. A detailed description of the first lens unit L1 will thus be omitted.

The second lens unit L2 according to the third exemplary embodiment consists of a positive lens Lp1, a positive lens Lp2, a negative lens Ln, a cemented lens B1, the aperture stop SP, and a positive lens Lp3 which are arranged in order from the object side to the image side. That is, the second lens unit L2 according to the third exemplary embodiment is similar to the second lens unit L2 according to the first exemplary embodiment except that the cemented lens B1 is arranged on the object side of the aperture stop SP, the cemented lens B2 is not included, and different glass materials are used. A detailed description of the second lens unit L2 will thus be omitted.

The third lens unit L3 according to the third exemplary embodiment has a configuration similar to that of the third lens unit L3 according to the first exemplary embodiment except that a meniscus lens concave to the image side is arranged closest to the object side, and different glass materials are used. A more detailed description of the third lens unit L3 will thus be omitted.

The exemplary embodiments of the present invention have been described above. However, an optical system according to an exemplary embodiment of the present invention is not limited to such exemplary embodiments, and various changes and modifications may be made without departing from the gist thereof. For example, a lens unit may be configured entirely or in part as an image stabilizing lens unit, and may be moved in a direction having a directional component perpendicular to the optical axis for image stabilization purposes. The cemented lenses B1 and B2 may include a positive lens and a negative lens arranged in reverse order.

EXAMPLES

Examples 1 to 3 corresponding to the first to third exemplary embodiments, respectively, will be described below. Table 1 illustrates numerical values corresponding to the conditional expressions (1) to (7) in examples 1 to 3. In examples 1 to 3, L indicates the order of lens units from the object side. A surface number indicates the order of optical surfaces from the object side. R is the radius of curvature of an optical surface, d the distance between optical surfaces (surface distance), and nd and νd are the refractive index and Abbe number of the material of an optical member at the d-line, respectively. The definition of the Abbe number νd is the same as described above. BF represents the back focal length.

In the examples, aspherical surfaces are marked with an asterisk (*) on the right of the respective surface numbers. An aspherical shape is expressed by $$X = \frac{H^2/R}{1 + \sqrt{1 - (1+K)(H/R)^2}} + A \cdot H^4 + B \cdot H^6 + C \cdot H^8 + D \cdot H^{10},$$

where the X-axis represents the optical axis direction, the H-axis represents a direction perpendicular to the optical axis, R is a paraxial radius of curvature with the traveling direction of light as positive, K is a conic constant, and A, B, C, and D are aspherical coefficients. "E-x" in the aspherical coefficients means $10^{-x}$.

The value of the surface distance d in the first row indicates the distance from the image plane.

Example 1

| | | in units of mm | | | | | |
|---|---|---|---|---|---|---|---|
| L | Surface number | Effective diameter | R | d | glass | nd | νd |
| | OBJ | | | ∞ | | | |
| 1 | 1 | 68.27 | 64.3369 | 6.0000 | SLAL14 | 1.69680 | 55.53 |
| | 2 | 66.68 | 90.3812 | 0.5000 | | | |
| | 3 | 65.49 | 61.8849 | 12.0000 | SFPL51 | 1.49700 | 81.54 |
| | 4 | 64.00 | −4074.4598 | 2.8000 | SNBH5 | 1.65412 | 39.68 |
| | 5 | 58.38 | 59.9904 | 13.6339 | | | |
| 2 | 6 | 56.02 | 45.7287 | 6.5000 | FD225 | 1.80809 | 22.76 |
| | 7 | 54.27 | 71.0617 | 0.5000 | | | |
| | 8 | 51.18 | 40.0000 | 10.5000 | SFPM2 | 1.59522 | 67.73 |
| | 9 | 48.78 | 261.1006 | 3.4789 | | | |
| | 10* | 41.01 | 70.6757 | 2.3000 | SNBH56 | 1.85478 | 24.80 |
| | 11 | 34.49 | 24.9321 | 8.9265 | | | |
| | 12 (SP) | 34.00 | ∞ | 3.3442 | | | |
| | 13 | 33.48 | −121.4681 | 1.6000 | SNBH8 | 1.72047 | 34.71 |
| | 14 | 33.46 | 83.5418 | 9.0000 | SLAH55V | 1.83481 | 42.72 |
| | 15 | 33.48 | −57.7130 | 1.7327 | | | |
| | 16 | 33.24 | −39.0562 | 1.5000 | SNBH5 | 1.65412 | 39.68 |
| | 17 | 34.61 | 36.5575 | 12.0000 | SLAH96 | 1.76385 | 48.49 |
| | 18 | 35.36 | −43.2713 | 2.0000 | | | |
| 3 | 19 | 37.27 | 92.2689 | 8.0000 | TAFD35 | 1.91082 | 35.25 |
| | 20 | 36.98 | −93.2521 | 1.7000 | SNBH5 | 1.65412 | 39.68 |
| | 21 | 35.87 | 39.5146 | 2.7488 | | | |
| | 22 | 36.10 | 80.2868 | 4.2000 | SLAH89 | 1.85150 | 40.78 |
| | 23 | 36.16 | −1651.2743 | 3.0812 | | | |
| | 24* | 36.18 | −84.1072 | 2.3000 | LBAL42 | 1.58313 | 59.38 |
| | 25* | 37.32 | 150.0000 | 15.0000 | | | |
| | Image plane | | ∞ | | | | |

Aspherical Coefficients

10th surface

K = 0
A = −4.43746E−06
B = −1.16566E−09
C = 1.78173E−12
D = −2.76788E−16

-continued in units of mm

24th surface

K = 0
A = −2.49992E−05
B = 1.07439E−07
C = −2.13888E−10
D = 1.7391E−13

25th surface

K = 0
A = −3.01305E−05
B = 1.06681E−07
C = −1.93587E−10
D = 1.59762E−13

Surface Distance

|  | ∞ | 4114.7 | 714.7 |
|---|---|---|---|
| 5th surface | 13.634 | 11.712 | 2.5 |
| 18th surface | 2 | 3.921 | 13.134 |

Various Data

| Focal length f | 83.5 |
|---|---|
| F-number | 1.24 |
| Half angle of view (degrees) | 14.5 |
| Image height | 21.6 |
| BF | 15.0 |
| Overall lens length | 135.3 |

Lens Unit Data

| Unit | Focal Length | Thickness |
|---|---|---|
| 1 | 554.9 | 21.3 |
| 2 | 79.4 | 61.4 |
| 3 | −409.6 | 22.0 |

Single Lens Data

| Lens | Starting surface | Focal length |
|---|---|---|
| 1 | 1 | 292.7 |
| 2 | 3 | 122.8 |
| 3 | 5 | −90.4 |
| 4 | 7 | 142.4 |
| 5 | 9 | 78.0 |
| 6 | 11 | −46.1 |
| 7 | 14 | −68.5 |
| 8 | 16 | 42.1 |
| 9 | 18 | −28.6 |
| 10 | 20 | 27.7 |
| 11 | 22 | 52.0 |
| 12 | 24 | −42.2 |
| 13 | 26 | 90.0 |
| 14 | 28 | −92.1 |

Surface Distance

|  | ∞ | 4114.7 | 714.7 |
|---|---|---|---|
| 5th surface | 13.634 | 11.712 | 2.5 |
| 18th surface | 2 | 3.921 | 13.134 |

Various Data

| Focal length f | 83.5 |
|---|---|
| F-number | 1.24 |
| Half angle of view (degrees) | 14.5 |
| Image height | 21.6 |
| BF | 15.0 |
| Overall lens length | 135.3 |

Example 2

| | | in units of mm | | | | | |
|---|---|---|---|---|---|---|---|
| L | Surface number | Effective diameter | R | d | glass | nd | vd |
| | OBJ | | ∞ | | | | |
| 1 | 1 | 69.09 | 66.3021 | 6.5000 | SFSL5 | 1.48749 | 70.24 |
| | 2 | 67.89 | 99.9439 | 0.5000 | | | |
| | 3 | 67.05 | 67.3160 | 12.0000 | SFPL51 | 1.49700 | 81.54 |
| | 4 | 65.73 | −965.7718 | 2.0000 | SNBH5 | 1.65412 | 39.68 |
| | 5 | 61.71 | 81.3783 | 16.3325 | | | |
| 2 | 6 | 57.47 | 51.1548 | 6.5000 | FD225 | 1.80809 | 22.76 |
| | 7 | 55.70 | 87.3305 | 0.5000 | | | |
| | 8 | 52.65 | 46.6589 | 9.0000 | SFPM2 | 1.59522 | 67.73 |
| | 9 | 50.39 | 209.6407 | 6.2976 | | | |
| | 10* | 40.58 | 93.9451 | 2.5000 | SNBH56 | 1.85478 | 24.80 |
| | 11 | 35.09 | 29.5483 | 8.7725 | | | |
| | 12 (SP) | 34.00 | ∞ | 3.5698 | | | |
| | 13 | 32.91 | −237.9163 | 1.6000 | SNBH8 | 1.72047 | 34.71 |
| | 14 | 31.89 | 27.1003 | 12.0000 | SLAL14 | 1.69680 | 55.53 |
| | 15 | 31.57 | −58.2201 | 1.1678 | | | |
| | 16 | 31.39 | −44.9376 | 1.5000 | SNBH8 | 1.72047 | 34.71 |
| | 17 | 33.32 | 44.8018 | 10.0000 | TAFD25 | 1.90366 | 31.31 |
| | 18 | 34.31 | −57.5232 | 2.0000 | | | |
| 3 | 19 | 35.17 | 157.4547 | 11.0000 | TAFD25 | 1.90366 | 31.31 |
| | 20 | 35.17 | −95.2114 | 1.7000 | SFTM16 | 1.59270 | 35.31 |
| | 21 | 34.69 | 47.2608 | 2.7694 | | | |
| | 22 | 34.87 | 148.4074 | 4.0000 | TAFD25 | 1.90366 | 31.31 |
| | 23 | 35.12 | 556.6911 | 3.2850 | | | |
| | 24* | 35.22 | −200.7702 | 3.0000 | LBAL42 | 1.58313 | 59.38 |
| | 25* | 36.93 | 173.3405 | 16.5000 | | | |
| | Image plane | | ∞ | | | | |

Aspherical Coefficients

10th surface

K = 0
A = −3.08858E−06
B = −1.29602E−10
C = 1.09293E−12
D = −4.63802E−16

24th surface

K = 0
A = −3.24165E−05
B = 6.8951E−08
C = −1.05855E−10
D = 1.0693E−13

25th surface

K = 0
A = −3.49161E−05
B = 7.183E−08
C = −1.04741E−10
D = 9.73374E−14

Surface Distance

| | ∞ | 4855 | 681.3 |
|---|---|---|---|
| 5th surface | 16.332 | 14.388 | 2.5 |
| 18th surface | 2 | 3.945 | 15.832 |

Lens Unit Data

| Unit | Focal Length | Thickness |
|---|---|---|
| 1 | 388.0 | 21.0 |
| 2 | 92.6 | 63.4 |
| 3 | −208.8 | 25.8 |

Single Lens Data

| Lens | Starting surface | Focal length |
|---|---|---|
| 1 | 1 | 383.1 |
| 2 | 3 | 128.0 |
| 3 | 5 | −114.4 |

-continued

| in units of mm | | |
|---|---|---|
| 4 | 7 | 139.3 |
| 5 | 9 | 97.7 |
| 6 | 11 | −51.1 |
| 7 | 14 | −33.4 |
| 8 | 16 | 28.0 |
| 9 | 18 | −30.7 |
| 10 | 20 | 29.1 |
| 11 | 22 | 66.6 |
| 12 | 24 | −52.8 |
| 13 | 26 | 232.3 |
| 14 | 28 | −168.4 |

| Various Data | |
|---|---|
| Focal length f | 98.0 |
| F-number | 1.43 |
| Half angle of view (degrees) | 12.4 |
| Image height | 21.6 |
| BF | 16.5 |
| Overall lens length | 145.0 |

Example 3

| | | in units of mm | | | | | |
|---|---|---|---|---|---|---|---|
| L | Surface number | Effective diameter | R | d | glass | nd | vd |
| | OBJ | | ∞ | | | | |
| 1 | 1 | 74.00 | 73.9810 | 10.9282 | PCD51 | 1.59349 | 67.00 |
| | 2 | 73.15 | 669.4545 | 0.5000 | | | |
| | 3 | 70.49 | 131.9313 | 10.5000 | SFPL51 | 1.49700 | 81.54 |
| | 4 | 69.00 | −187.2448 | 2.0000 | SNBH5 | 1.65412 | 39.68 |
| | 5 | 63.27 | 80.0000 | 15.7431 | | | |
| 2 | 6 | 59.28 | 60.4603 | 9.0000 | FD225 | 1.80809 | 22.76 |
| | 7 | 57.95 | 630.3370 | 0.5000 | | | |
| | 8 | 48.33 | 38.6376 | 11.0000 | SFPL51 | 1.49700 | 81.54 |
| | 9 | 45.60 | −634.9310 | 2.3000 | TAFD25 | 1.90366 | 31.31 |
| | 10 | 37.75 | 33.5191 | 3.7731 | | | |
| | 11 | 37.46 | 70.1798 | 10.5000 | SFPL51 | 1.49700 | 81.54 |
| | 12 | 35.36 | −39.1273 | 1.6000 | TAFD25 | 1.90366 | 31.31 |
| | 13 | 33.95 | 82.8597 | 3.7567 | | | |
| | 14 (SP) | 34.00 | ∞ | 4.5459 | | | |
| | 15* | 34.75 | 74.9104 | 9.0000 | LLAH85V | 1.85400 | 40.38 |
| | 16 | 34.53 | −59.2091 | 2.0000 | | | |
| 3 | 17 | 27.82 | 70.3482 | 1.5000 | STIM25 | 1.67270 | 32.10 |
| | 18 | 26.62 | 25.7210 | 3.9752 | | | |
| | 19 | 27.24 | 68.8793 | 9.8777 | STIM25 | 1.67270 | 32.10 |
| | 20 | 28.07 | −34.1634 | 2.0000 | SFPM2 | 1.59522 | 67.73 |
| | 21 | 29.05 | 72.6475 | 7.6863 | | | |
| | 22 | 31.90 | −181.7573 | 3.3948 | STIM5 | 1.60342 | 38.03 |
| | 23 | 32.68 | −64.7333 | 2.9133 | | | |
| | 24* | 32.83 | −63.0461 | 3.0000 | LBAL42 | 1.58313 | 59.38 |
| | 25* | 36.00 | 500.0000 | 18.0000 | | | |
| | Image plane | | ∞ | | | | |

| Aspherical Coefficients |
|---|
| 15th surface |
| K = 0 |
| A = −1.6809E−06 |
| B = 3.8083E−10 |
| C = −1.08687E−13 |
| D = 0 |
| 24th surface |
| K = 0 |
| A = −4.57461E−05 |
| B = 1.10493E−07 |
| C = −2.22651E−10 |
| D = 0 |

-continued in units of mm

25th surface

K = 0
A = −5.02873E−05
B = 1.05257E−07
C = −2.2049E−10
D = 1.03734E−13

Surface Distance

|  | ∞ | 6600 | 543.9 |
|---|---|---|---|
| 5th surface | 15.74 | 14.63 | 2.5 |
| 16th surface | 2 | 3.11 | 15.24 |

Lens Unit Data

| Unit | Focal Length | Thickness |
|---|---|---|
| 1 | 331.0 | 23.9282 |
| 2 | 78.3 | 56.0 |
| 3 | −55.0 | 34.3 |

Single Lens Data

| Lens | Starting surface | Focal length |
|---|---|---|
| 1 | 1 | 139.1 |
| 2 | 3 | 157.5 |
| 3 | 5 | −85.4 |
| 4 | 7 | 82.1 |
| 5 | 9 | 73.7 |
| 6 | 11 | −35.2 |
| 7 | 13 | 52.2 |
| 8 | 15 | −29.2 |
| 9 | 18 | 40.0 |
| 10 | 20 | −61.2 |
| 11 | 22 | 35.3 |
| 12 | 24 | −38.8 |
| 13 | 26 | 164.4 |
| 14 | 28 | −95.7 |

Various Data

| Focal length f | 133.0 |
|---|---|
| F-number | 1.80 |
| Half angle of view (degrees) | 9.2 |
| Image height | 21.6 |
| BF | 18.0 |
| Overall lens length | 150.0 |

TABLE 1

|  | Example 1 | Example 2 | Example 3 |
|---|---|---|---|
| D3/BF | 1.47 | 1.56 | 1.91 |
| f1/f | 6.65 | 3.96 | 2.49 |
| f2/f | 0.95 | 0.95 | 0.59 |
| f3/f | −4.91 | −2.13 | −0.42 |
| vd2 − vd1 | 44.97 | 44.97 | 58.78 |
| θgF | 0.63 | 0.63 | 0.63 |
| Nd1 | 1.81 | 1.81 | 1.81 |

Next, an exemplary embodiment of an imaging apparatus using an optical system according to an exemplary embodiment of the present invention as its imaging optical system will be described with reference to FIG. 7. For example, an imaging apparatus 10 is an imaging apparatus using an image sensor, for example, a digital still camera, a video camera, a surveillance camera, and a broadcasting camera, or an imaging apparatus using a silver-halide photographic film, like a camera.

Figure 7:
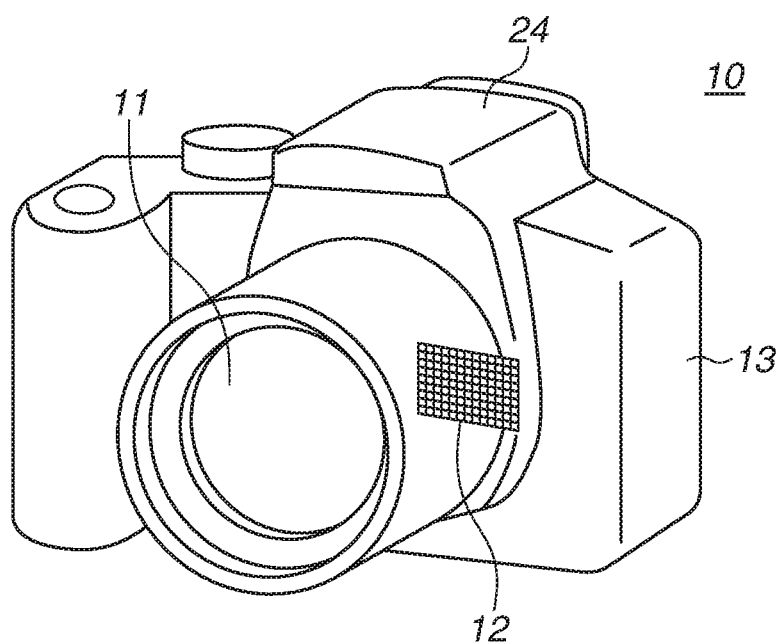
FIG. 7 is a diagram illustrating a configuration of an imaging apparatus.

In FIG. 7, a camera main body 13 includes an imaging optical system 11 and a solid-state image sensor (photoelectric conversion element) 12. The imaging optical system 11 is any one of the optical systems described in the first to third exemplary embodiments. The solid-state image sensor 12 is built in the camera main body 13 and receives an object image formed by the imaging optical system 11. Examples of the solid-state image sensor 12 include a CCD sensor and a CMOS sensor. A memory (not illustrated) is a recording unit for recording the object image received by the solid-state image sensor 12. A viewfinder 24 is a viewfinder for observing an object image that is formed on the solid-state image sensor 12 and displayed on a display device (not illustrated). A lens apparatus including the imaging optical system 11 may be configured integrally with the camera main body 13 or to be detachably mountable on the camera main body 13.

A downsized imaging apparatus having high optical performance from infinity to the closest distance can thus be provided by the application of an optical system according to an exemplary embodiment of the present invention to an imaging apparatus, such as a digital still camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-219347, filed Nov. 14, 2017, which is hereby incorporated by reference herein in its entirety.

What is claimed is:

1. An optical system comprising
a plurality of lens units in which a distance between adjoining lens units changes during focusing, the plurality of lens units comprising a first lens unit having positive refractive power, a second lens unit having positive refractive power, and a third lens unit having negative refractive power, and the first to third lens units being arranged in order from an object side to an image side,
wherein:
an entirety of the second lens unit moves to the object side during focusing from infinity to a closest distance,
the second lens unit comprises an aperture stop, and
the following conditional expression is satisfied:

$1.0 < D3/BF < 3.0$, where D3 is a length of the third lens unit on the optical axis of the optical system, and BF is a back focal length.

2. The optical system according to claim 1, wherein the second lens unit comprises a first positive lens arranged on the object side of the aperture stop and a positive lens arranged on the image side of the aperture stop.

3. The optical system according to claim 2, wherein the second lens unit comprises a negative lens arranged on the object side of the aperture stop, the negative lens being arranged on the image side of the first positive lens.

4. The optical system according to claim 3, wherein the negative lens is a meniscus lens having an aspherical surface.

5. The optical system according to claim 2,
wherein the second lens unit comprises a second positive lens arranged on the object side of the aperture stop, the second lens unit being arranged on the image side of the first positive lens, and
wherein the following conditional expression is satisfied:

$20 < vd2 - vd1$, where vd1 is an Abbe number of material of the first positive lens, and vd2 is an Abbe number of material of the second positive lens.

6. The optical system according to claim 5, wherein a following conditional expression is satisfied:

$0.59 < \theta gF$, wherein θgF is a partial dispersion ratio of the material of the first positive lens.

7. The optical system according to claim 5, wherein a following conditional expressing is satisfied:

$1.70 < Nd1 < 1.90$, where Nd1 is a refractive index of the material of the first positive lens for a d-line.

8. The optical system according to claim 7, wherein the first positive lens is arranged closest to an object side in the second lens unit.

9. The optical system according to claim 1, wherein the second lens unit comprises a cemented lens comprising a positive lens and a negative lens, the cemented lens being arranged next to the aperture stop.

10. The optical system according to claim 1, wherein the second lens unit has an aspherical surface.

11. The optical system according to claim 1, wherein the third lens unit comprises a plurality of positive lenses and a plurality of negative lenses.

12. The optical system according to claim 1, wherein the third lens unit comprises a negative lens having an aspherical surface, the negative lens being arranged closest to an image plane in the third lens unit.

13. The optical system according to claim 1, wherein the second lens unit comprises a first positive lens, a second positive lens, a negative lens, the aperture stop, and a third positive lens arranged in order from the object side to the image side.

14. The optical system according to claim 1, wherein the second lens unit consists of a first positive lens, a second positive lens, a negative lens, the aperture stop, a first cemented lens comprising a positive lens and a negative lens, and a second cemented lens comprising a positive lens and a negative lens, arranged in order from the object side to the image side.

15. The optical system according to claim 1, wherein the second lens unit consists of a first positive lens, a second positive lens, a negative lens, a cemented lens comprising a positive lens and a negative lens, the aperture stop, and a third positive lens arranged in order from the object side to the image side.

16. The optical system according to claim 1, wherein the plurality of lens units consists of the first lens unit, the second lens unit, and the third lens unit.

17. An imaging apparatus comprising:
the optical system according to claim 1; and
an image sensor configured to receive an image formed by the optical system.

* * * * *